United States Patent
Kim et al.

(10) Patent No.: US 11,356,021 B2
(45) Date of Patent: Jun. 7, 2022

(54) DC-TO-DC CONVERTER INCLUDING FLYING CAPACITOR

(71) Applicants: HYUNDAI MOTOR COMPANY, Seoul (KR); KIA MOTORS CORPORATION, Seoul (KR)

(72) Inventors: Jung Hwi Kim, Hwaseong-si (KR); Jung Mo Yu, Seoul (KR); Yong Jae Lee, Hwaseong-si (KR); Jae Ho Hwang, Daejeon (KR); Joo Young Park, Yongin-si (KR); Jae Hyeon Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 30 days.

(21) Appl. No.: 17/030,909

(22) Filed: Sep. 24, 2020

(65) Prior Publication Data

US 2021/0313886 A1    Oct. 7, 2021

(30) Foreign Application Priority Data

Apr. 1, 2020   (KR) .................. 10-2020-0040003

(51) Int. Cl.
*H02M 3/158* (2006.01)
*H02M 1/08* (2006.01)
*H02M 1/00* (2006.01)
*H02M 3/07* (2006.01)

(52) U.S. Cl.
CPC ......... *H02M 3/158* (2013.01); *H02M 1/0095* (2021.05); *H02M 1/08* (2013.01); *H02M 1/0009* (2021.05); *H02M 3/07* (2013.01)

(58) Field of Classification Search
CPC ........ H02M 3/158; H02M 3/156; H02M 3/07; H02M 1/08; H02M 1/0009; H02M 1/0095
See application file for complete search history.

(56) References Cited

U.S. PATENT DOCUMENTS

| 7,746,041 | B2 | 6/2010 | Xu et al. |
| 9,866,113 | B1* | 1/2018 | Assaad ............... H02M 3/158 |
| 10,554,124 | B1* | 2/2020 | Mangudi ............. H02M 3/158 |

(Continued)

FOREIGN PATENT DOCUMENTS

| JP | 5975687 B2 | 8/2016 |
| JP | 6223609 B2 | 11/2017 |

*Primary Examiner* — Kyle J Moody
*Assistant Examiner* — Jye-June Lee
(74) *Attorney, Agent, or Firm* — Morgan, Lewis & Bockius LLP

(57) ABSTRACT

A DC-to-DC converter includes a first capacitor, first, second, third, and fourth switches connected in series between first and second electrodes of the first capacitor, a second capacitor connected to a connection node of the first switch and the second switch and a connection node of the third switch and the fourth switch, an inductor connected to a connection node of the second switch and the third switch, and a controller that controls an on/off state of each of the first to fourth switches on the basis of a value obtained by applying a reciprocal of a detection current that is a measured current flowing through the inductor to a difference between a first detection voltage and a first voltage instruction value and a difference between a second detection voltage and a second voltage instruction value.

11 Claims, 9 Drawing Sheets

(56) References Cited

U.S. PATENT DOCUMENTS

| | | | |
|---|---|---|---|
| 10,686,370 B1* | 6/2020 | Bonnano | H02M 3/158 |
| 2013/0229839 A1* | 9/2013 | Escobar | H02M 1/12 |
| | | | 363/40 |
| 2019/0058385 A1* | 2/2019 | Lazaro | H02M 3/158 |
| 2019/0058397 A1* | 2/2019 | Lazaro | H02M 3/158 |

* cited by examiner

DC-TO-DC CONVERTER INCLUDING FLYING CAPACITOR

CROSS REFERENCE TO RELATED APPLICATION

The present application claims priority to Korean Patent Application No. 10-2020-0040003, filed Apr. 1, 2020, the entire contents of which are incorporated herein for all purposes by this reference.

TECHNICAL FIELD

The present disclosure relates to a DC-to-DC converter and, more particularly, to a DC-to-DC converter with a flying capacitor having improved controllability.

BACKGROUND

A DC-to-DC converter that converts a source of direct current (DC) from one voltage level to another is widely used in various electronic devices.

Regarding a conventional DC-to-DC converter, a technique of converting the voltage of a DC supply to another voltage by controlling the amount of energy accumulation and the amount of energy discharge of an inductor through an on/off operation of a semiconductor switch is known. This type of DC-to-DC converter has a disadvantage that the inductor is large and heavy.

To solve this problem, i.e., to reduce the size and weight of an inductor, the inductance of the inductor needs to be reduced. To this end, a technique of reducing a voltage applied to the inductor by charging and discharging a capacitor has been developed.

Among many DC-to-DC converters using such a technique, there is a DC-to-DC converter that includes a series of switches and a flying capacitor disposed between two switches of the series of switches.

Such a DC-to-DC converter with a flying capacitor has a problem in that its control is difficult because the voltage of the flying capacitor needs to be maintained at a constant level. When the voltage of the flying capacitor deviates significantly from a certain level, a high voltage is applied to switches so that the switches may be burned.

Accordingly, there is a need for a technique of improving controllability of a voltage applied to a flying capacitor.

The foregoing is intended merely to aid in the understanding of the background of the present disclosure, and is not intended to mean that the present disclosure falls within the purview of the related art that is already known to those skilled in the art.

SUMMARY

One objective of the present disclosure is to provide a DC-to-DC converter with a flying capacitor having improved controllability.

In order to accomplish the objective, according to one aspect of the present disclosure, there is provided a DC-to-DC converter including: a first capacitor; first, second, third, and fourth switches connected in series between a first electrode and a second electrode of the first capacitor; a second capacitor having a first electrode and a second electrode respectively connected to a connection node of the first switch and the second switch and a connection node of the third switch and the fourth switch; an inductor having a first terminal connected to a connection node of the second switch and the third switch; and a controller that controls an on/off state of each of the first to fourth switches on the basis of a value obtained by applying a reciprocal of a detection current that is a measured current flowing through the inductor to a difference between a first detection voltage and a first voltage instruction value and a difference between a second detection voltage and a second voltage instruction value, wherein the first detection voltage is a measured voltage between the first electrode and the second electrode of the first capacitor or a measured voltage between a second terminal of the inductor and a connection node of the first capacitor and the fourth switch, and the second detection voltage is a measured voltage between the first electrode and the second electrode of the second capacitor.

In one embodiment of the present disclosure, the controller may control the on/off state of each of the first to fourth switches on the basis of a value obtained by applying a preset proportional control constant to a difference between the second detection voltage and the second voltage instruction value and multiplying the resultant value of the application of the preset proportional control constant by a reciprocal of the detection current.

In one embodiment of the present disclosure, when the detection current has a magnitude that is within a preset range in the vicinity of zero, the controller may determine the reciprocal of the detection current as a preset constant value.

In one embodiment of the present disclosure, when the detection current has a magnitude that is within a preset range in the vicinity of zero, the controller may determine the reciprocal of the detection current as a preset constant value that linearly changes within the preset range.

In one embodiment of the present disclosure, the controller may include: a voltage controller that generates a current instruction value that is a target current to flow through the inductor on the basis of a difference between the first detection voltage and the first voltage instruction value; a current controller that generates a first control voltage instruction value on the basis of a difference between the current instruction value and the detection current; and a flying capacitor voltage controller that generates a second control voltage instruction value on the basis of a difference between the second detection voltage and the second voltage instruction value and a reciprocal of the detection current.

In one embodiment of the present disclosure, the flying capacitor voltage controller may include: a subtractor that calculates the difference between the second detection voltage and the second voltage instruction value; a proportional controller that outputs a value obtained by applying a proportional control value to the calculation result of the subtractor; a reciprocal calculator that calculates a reciprocal of the detection current; and a multiplier that multiplies the value output from the proportional controller by the calculation result of the reciprocal calculator and outputs the product resulting from the multiplication as the second control voltage instruction value.

In one embodiment of the present disclosure, when the detection current has a magnitude that is within a preset range in the vicinity of zero, the reciprocal calculator may determine the reciprocal of the detection current as a preset constant value.

In one embodiment of the present disclosure, when the detection current has a magnitude that is within a preset range in the vicinity of zero, the reciprocal calculator may determine the reciprocal of the detection current as a preset constant value that linearly changes within the preset range.

In one embodiment of the present disclosure, the controller may include: a first adder that adds the first control voltage instruction value and the second control voltage instruction value to produce a first duty instruction value; a subtractor that subtracts the first control voltage instruction value from the first detection voltage; a second adder that adds an output value of the subtractor to the second control voltage instruction value to produce a second duty instruction value; a first switching controller that determines an on/off state of each of the first switch and the fourth switch according to a result of comparison between the first duty instruction value and a triangular wave signal having a predetermined frequency; and a second switching controller that determines an on/off state of each of the second switch and the third switch according to a result of comparison between the second duty instruction value and the triangular wave signal.

In one embodiment of the present disclosure, the DC-to-DC converter may further include a voltage sensor for obtaining the measured voltage between the first electrode and the second electrode of the first capacitor or the measured voltage between the second terminal of the inductor and the connection node of the first capacitor and the fourth switch.

In one embodiment of the present disclosure, the DC-to-DC converter may further include a current sensor for obtaining the measured current flowing through the inductor.

In the DC-to-DC converter according to the present disclosure, the controllability of the voltage applied to the flying capacitor is improved. That is, since the voltage of the flying capacitor is easily maintained at a desired level, damage to the switches attributable to application of an over-voltage can be prevented.

The effects and advantages that can be achieved by the present disclosure are not limited to the ones mentioned above, and other effects and advantages which are not mentioned above but can be achieved by the present disclosure can be clearly understood by those skilled in the art from the following description.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF THE PREFERRED EMBODIMENTS

Hereinafter, DC-to-DC converters according to various embodiments of the present disclosure will be described in detail with reference to the accompanying drawings.

Figure 1:
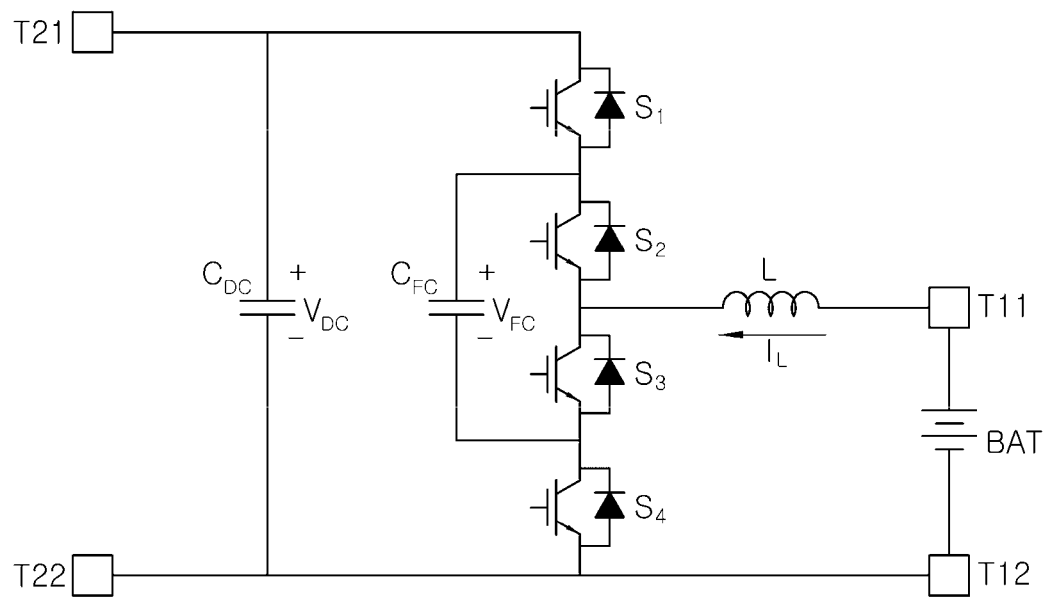
FIG. 1 is a circuitry diagram illustrating a DC-to-DC converter according to one embodiment of the present disclosure.
Figure 1:
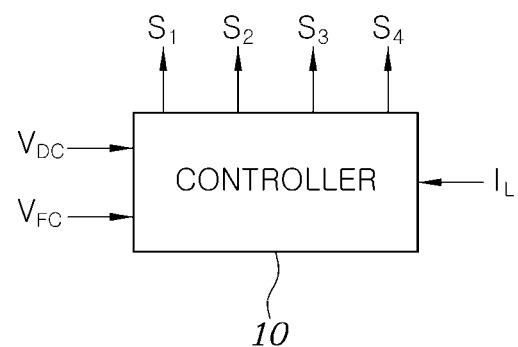

FIG. 1 is a circuit diagram of a DC-to-DC converter according to one embodiment of the present disclosure.

Referring to FIG. 1, a DC-to-DC converter according to one embodiment of the present disclosure converts a voltage applied between a first input/output (I/O) terminal T11 and a second I/O terminal T12 to a higher voltage, and supplies the raised voltage between a third I/O terminal T21 and a fourth I/O terminal T22. On the contrary, the DC-to-DC converter converts a voltage applied between the third I/O terminal T21 and the fourth I/O terminal T22 to a lower voltage and supplies the generated lower voltage between the first I/O terminal T11 and the second I/O terminal T12. FIG. 1 illustrates an exemplary converter that includes a battery BAT disposed between the first I/O terminal T11 and the second I/O terminal T12, raises the voltage of a supply current of the battery BAT to a higher voltage, and supplies the generated higher voltage between the third I/O terminal T21 and the fourth I/O terminal T22. For example, a load is connected between the third I/O terminal T21 and the fourth I/O terminal T22.

The following description relates to an example in which a voltage resulting from stepping up an output voltage of the battery BAT is applied between the third I/O terminal T21 and the fourth I/O terminal T22. However, those skilled in the art will appreciate that the reverse is possible. That is, the voltage applied between the third I/O terminal T21 and the fourth I/O terminal T22 is stepped down and the resulting lowered voltage is applied between the first I/O terminal T11 and the second I/O terminal T12.

A DC-to-DC converter according to one embodiment of the present disclosure includes: a first capacitor $C_{DC}$ having a first electrode and a second electrode respectively connected to a third I/O terminal T21 and a fourth I/O terminal T22; first to fourth switches $S_1$, $S_2$, $S_3$, and $S_4$ that are connected in series between the first electrode and the second electrode of the first capacitor $C_{DC}$; a second capacitor $C_{FC}$ having a first electrode and a second electrode respectively connected to a connection node between the first switch $S_1$ and the second switch $S_2$ and a connection node between the third switch $S_3$ and the fourth switch $S_4$; an inductor L having a first terminal connected to a connection node between the second switch $S_2$ and the third switch $S_3$; and a controller 10 that controls an on/off state of each of the first to fourth switches $S_1$ to $S_4$. In one example, the outputs $S_1$ to $S_4$ from the controller 10 may be respectively connected to gates of the first to fourth switches $S_1$ to $S_4$.

The first capacitor $C_{DC}$ is a smoothing capacitor connected between the third I/O terminal T21 and the fourth I/O terminal T22. Although not illustrated in FIG. 1, an additional smoothing capacitor may be connected between the first I/O terminal T11 and the second I/O terminal T12.

The first to fourth switches $S_1$ to $S_4$ are connected in series in this order from the first electrode side to the second electrode side of the first capacitor $C_{DC}$. Each of the first to fourth switches $S_1$ to $S_4$ is implemented with an insulated gate bipolar transistor (IGBT). Each of the switches is turned on or off according to an on/off control signal that is input to the gate thereof from the controller 10. Alternatively, each of the first to fourth switches $S_1$ to $S_4$ may be implemented with any arbitrary switching element known in the art, instead of the IGBT.

The second capacitor $C_{FC}$ is a flying capacitor in which the first electrode and the second electrode thereof are respectively connected to the connection node between the first switch $S_1$ and the second switch $S_2$ and the connection node between the third switch $S_3$ and the fourth switch $S_4$.

Although not illustrated in the drawings, the DC-to-DC converter according to one embodiment of the present disclosure may include a plurality of sensors for detecting internal circuitry information that is used by the controller 10 to generate the on/off control signal for each of the first to fourth switches $S_1$ to $S_4$. The plurality of sensors may include a voltage sensor for measuring the voltage between the first I/O terminal T11 and the second I/O terminal T12 or the voltage $V_{DC}$ between the third I/O terminal T21 and the fourth I/O terminal T22, a voltage sensor for measuring the voltage $V_{FC}$ of the second capacitor $C_{FC}$, and a current sensor for measuring the current $I_L$ flowing through the inductor L. The voltage values and the current values measured by the voltage sensors and the current sensor are referred to as detection voltages and detection current, respectively. The detection voltages and the detection current are input to the controller 10.

The controller 10 receives a first detection voltage that is the actually measured voltage between the first electrode and the second electrode of the first capacitor $C_{DC}$ or between a second terminal of the inductor L and the connection node of the first capacitor $C_{DC}$ and the fourth switch $S_4$. The first detection voltage corresponds to an output voltage generated through a step-up operation or an output voltage obtained through a step-down operation of the DC-to-DC converter. In the case of the step-up operation, the first detection voltage corresponds to the voltage between the third I/O terminal T21 and the fourth I/O terminal T22 (i.e., the voltage of the first capacitor $C_{DC}$). In the case of the step-down operation, the first detection voltage corresponds to the voltage between the first I/O terminal T11 and the second I/O terminal T12.

The controller 10 compares the first detection voltage with a first voltage instruction value, and calculates a difference therebetween. The first voltage instruction value refers to a target voltage to be output from the DC-to-DC converter. The first voltage instruction value is set by an upper-level controller. In one example, a set value or a preset value may be stored in a storage and may be read by the controller 10, or may be transmitted to the controller 10 from the upper-level controller.

The controller 10 receives a detection voltage $V_{FC}$ that is a measured voltage applied to the second capacitor $C_{FC}$, compares the detection voltage $V_{FC}$ with a second voltage instruction value that is preset, and calculates a difference therebetween. The voltage instruction value is preset by the upper-level controller and is about half the voltage of the first capacitor $C_{DC}$. According to one embodiment of the present disclosure, the controller 10 controls an on/off state of each of the switches $S_1$ to $S_4$ on the basis of the product of the actually measured current (i.e. detection current) of the inductor L and the difference between the second detection voltage $V_{FC}$ applied to the second capacitor $C_{FC}$ and the second voltage instruction value.

Figure 2:
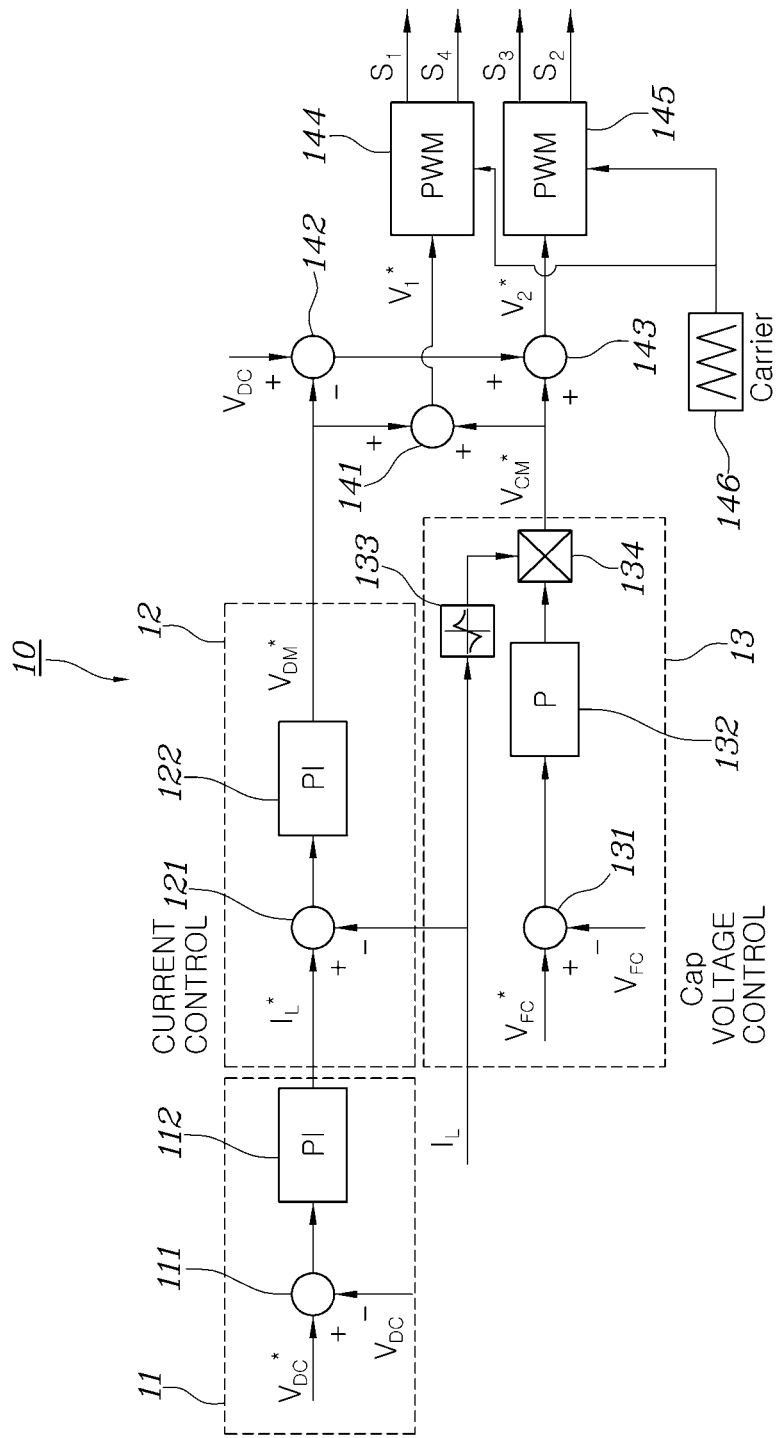
FIG. 2 is a block diagram illustrating in more detail the controller of the DC-to-DC converter according to one embodiment of the present disclosure.

FIG. 2 is a block diagram illustrating in more detail the controller of the DC-to-DC converter according to one embodiment of the present disclosure.

Referring to FIG. 2, the controller 10 of the DC-DC converter according to one embodiment of the present disclosure includes a voltage controller 11, a current controller 12, and a flying capacitor voltage controller 13.

The voltage controller 11 includes a subtractor 111 and a PI controller 112. The subtractor 111 compares the detection voltage $V_{DC}$ which is an actually measured voltage between the first I/O terminal T11 and the second I/O terminal T12 or the detection voltage $V_{DC}$ which is an actually measured voltage between the third I/O terminal T21 and the fourth I/O terminal T22 with a first voltage instruction value $V_{DC}*$ that is preset and calculates a difference between the detection voltage $V_{DC}$ and the first voltage instruction value $V_{DC}*$. The PI controller 112 performs proportional integral control to reduce the difference calculated by the subtractor 111. The PI controller 112 outputs an inductor current instruction value $I_L*$ indicating a target current to flow through the inductor L, by which the difference calculated by the subtractor 111 can be reduced, by performing the proportional integral control.

The current controller 12 includes a subtractor 121 and a PI controller 122. The subtractor 121 calculates a difference between the inductor current instruction value $I_L*$ which is provided by the voltage controller 11 and the actual detection current $I_L$ flowing through the inductor L. The PI controller 122 performs proportional integral control to generate a first control voltage instruction value $V_{DM}*$ that can reduce the output value of the subtractor 121. The first control voltage instruction value $V_{DM}*$ is used to determine an on-off duty of the switches $S_1$ to $S_4$.

FIG. 2 illustrates an example in which the voltage controller 11 and the current controller 12 perform the proportional integral control. However, the control technique is not limited thereto. Various techniques known in the art may be used.

The flying capacitor voltage controller 13 includes a subtractor 131, a proportional controller 132, a reciprocal calculator 133, and a multiplier 134. The subtractor 131 receives the detection voltage $V_{FC}$ applied to the second capacitor $C_{FC}$, compares the detection voltage $V_{FC}$ with a preset second voltage instruction value $V_{FC}*$, and calculates a difference therebetween. The proportional controller 132 performs proportional control and outputs a control instruction value that can reduce the output value of the subtractor 131. The reciprocal calculator 133 calculates the reciprocal of the detected inductor current $I_L$, and the multiplier 134 multiplies the output value of the proportional controller 132 by the reciprocal output from the reciprocal calculator 133 and outputs the calculated product as a second control voltage instruction value $V_{CM}*$.

In addition, the controller 10 may further include: an adder 141 that sums the first control voltage instruction value $V_{DM}*$ output from the current controller 12 and the second control voltage instruction value $V_{CM}*$ output from the flying capacitor voltage controller 13 and generates a first duty instruction value $V_1*$; a subtractor 142 that subtracts the first control voltage instruction value $V_{DM}*$ from the detection voltage $V_{DC}$ detected between the I/O terminals; a second adder 143 that adds the resultant value output from the subtractor 142 to the second control voltage instruction value $V_{CM}*$; a first switching controller 144 that determines an on/off state of each of the first and fourth switches $S_1$ and $S_4$ according a result of comparison between the first duty instruction value $V_1*$ and a triangular wave signal having a preset frequency generated by the triangular wave generator 146; and a second switching controller 145 that determines an on/off state of each of the second switch $S_2$ and the third switch $S_3$ according to a result of comparison between the second duty instruction value $V_2*$ and the triangular wave signal having the preset frequency output from the triangular wave generator 146.

Regarding the configuration described above, the first duty instruction value $V_1*$ and the second duty instruction value $V_2*$ are expressed by Equations 1, using the first control voltage instruction value $V_{DM}*$ and the second control voltage instruction value $V_{CM}*$.

$$V_1^* = V_{CM}^* + V_{DM}^*$$

$$V_2^* = V_{CM}^* + (V_{DC} - V_{DM}^*) \quad \text{[Equations 1]}$$

Where the first control voltage instruction value $V_{DM}^*$ is a value generated on the basis of the output voltage $V_{DC}$ of the DC-to-DC converter and has an impact on the output, and the second control voltage instruction value $V_{CM}^*$ is a value generated on the basis of the voltage $V_{FC}^*$ of the flying capacitor and has an impact on the voltage $V_{FC}^*$ of the flying capacitor or on the difference $V_{DC}-V_{FC}$ between the output voltage $V_{DC}$ of the DC-to-DC converter and the voltage $V_{FC}$ of the flying capacitor. That is, the first control voltage instruction value $V_{DM}^*$ is used to control the output voltage of the DC-to-DC converter and the second control voltage instruction value $V_{CM}^*$ is used to control the voltage of the flying capacitor.

FIGS. 3 to 6 are diagrams illustrating a flow of current in the DC-to-DC converter according to one embodiment of the present disclosure.

Figure 3:
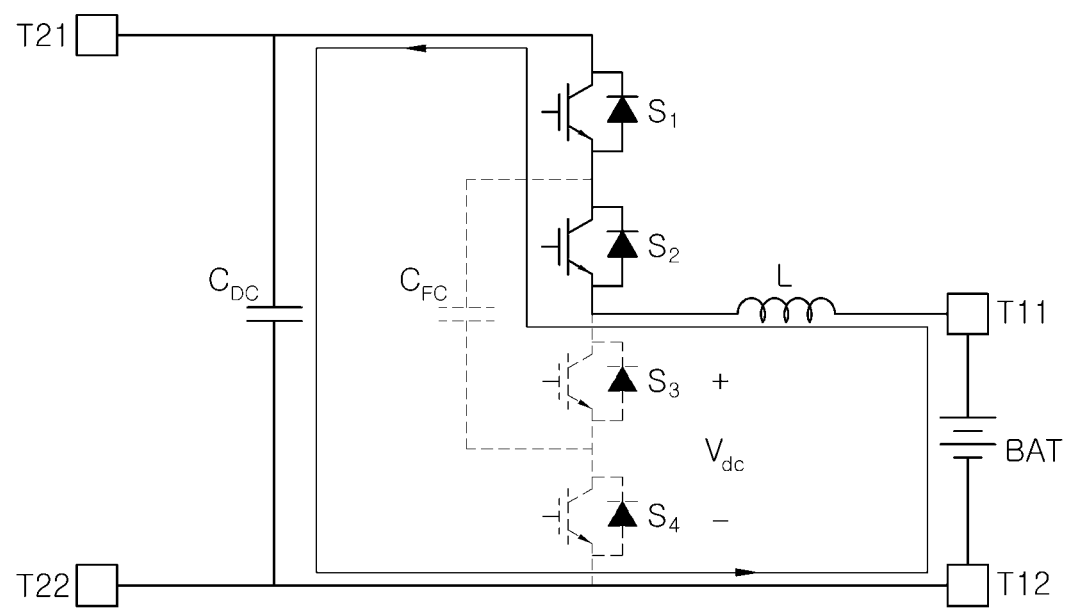
FIGS. 3 to 6 are diagrams illustrating a flow of current in the DC-to-DC converter according to one embodiment of the present disclosure.

FIG. 3 illustrates a first state in which the first switch $S_1$ and the second switch $S_2$ are turned on and the third switch $S_3$ and the fourth switch $S_4$ are turned off. The first state is created when the voltage $V_{DC}$ of the capacitor $C_{DC}$ is fully applied to the connection node of the inductor L and the switch $S_2$ or $S_3$.

Figure 4:
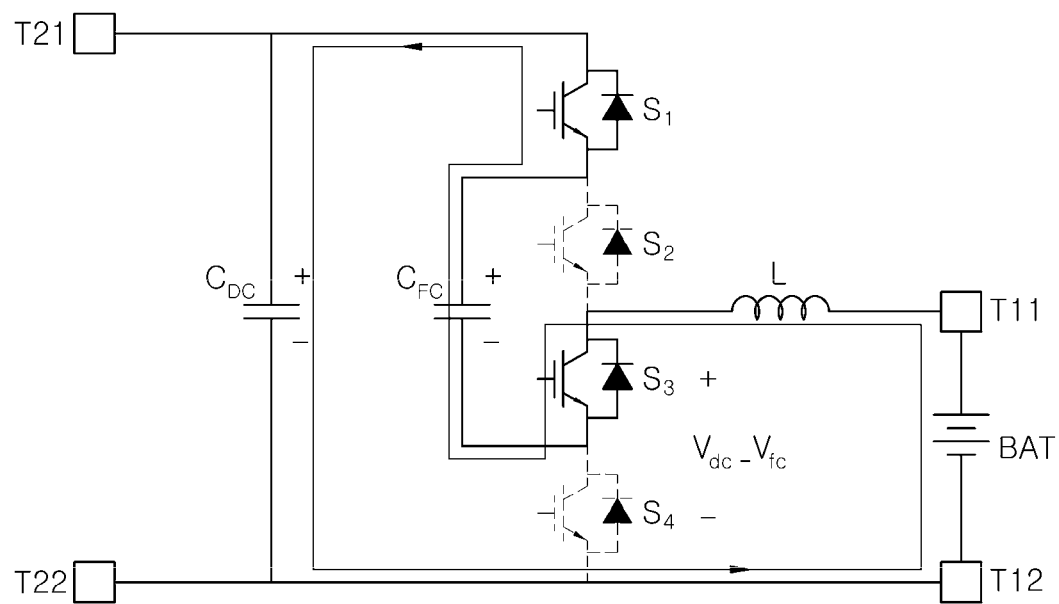

FIG. 4 illustrates a second state in which the first switch $S_1$ and the third switch $S_3$ are turned on and the second switch $S_2$ and the fourth switch $S_4$ are turned off. The second state is created when a voltage corresponding to the difference between the voltage $V_{DC}$ of the capacitor $C_{DC}$ and the voltage $V_{FC}$ of the flying capacitor $C_{FC}$ is applied to the connection node of the inductor L and the switch $S_2$ or $S_3$.

Figure 5:
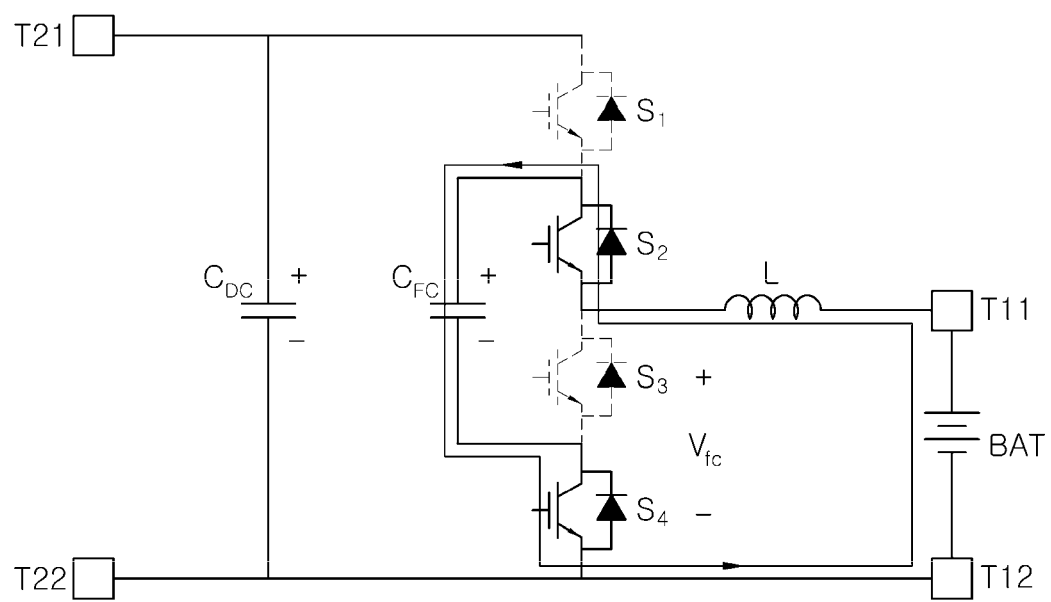

FIG. 5 illustrates a third state in which the second switch $S_2$ and the fourth switch $S_4$ are turned on and the first switch $S_2$ and the third switch $S_3$ are turned off. The third state is created when the voltage $V_{FC}$ of the flying capacitor $C_{FC}$ is applied to the connection node of the inductor L and the switch $S_2$ or $S_3$.

Figure 6:
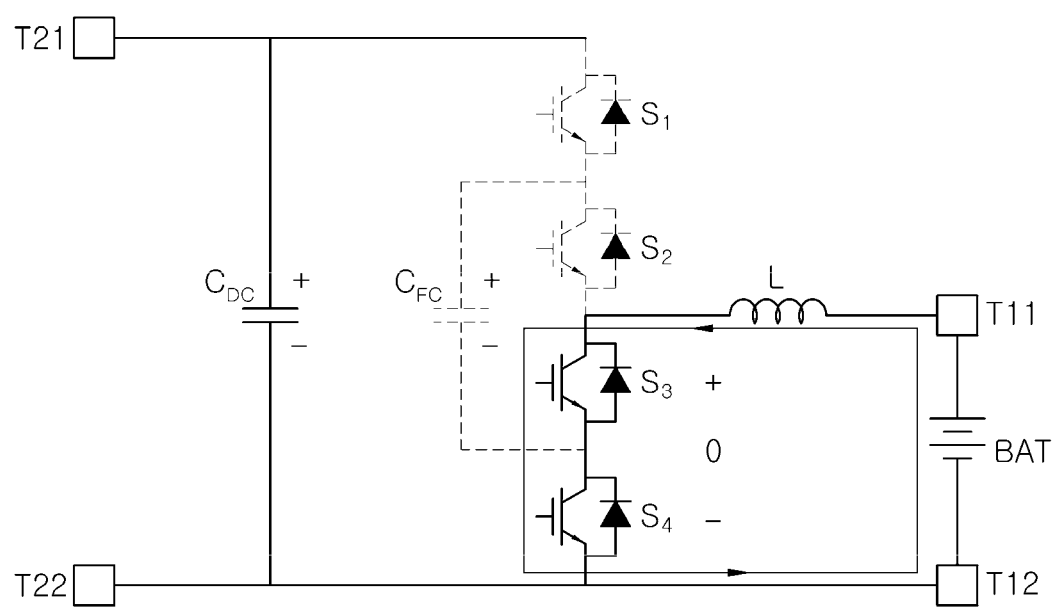

FIG. 6 illustrates a fourth state in which the first switch $S_1$ and the second switch $S_2$ are turned off and the third switch $S_3$ and the fourth switch $S_4$ are turned on. The fourth state is created when no voltage is applied to the connection node of the inductor L and the switch $S_2$ or $S_3$.

Among the states illustrated in FIGS. 3 to 6, in the second and third states in which current flows through the second capacitor $C_{FC}$ called the flying capacitor $C_{FC}$, the voltage of the flying capacitor $C_{FC}$ changes. During the total duration of the second and third states, the electric energy charged into or discharged from the flying capacitor $C_{FC}$ depends on the current flowing through the inductor L and on a ratio of the second state and the third state.

This can be expressed by Equations 2.

$$I_{FC} = sC_{FC}V_{FC}$$

$$I_{FC} = D_{CM} \cdot I_L$$

$$D_{CM} = (V_{PC}^* - F_C) \cdot K_P \quad \text{[Equations 2]}$$

Where "$D_{CM}$" refers to a duty at which current flows through the flying capacitor $C_{FC}$ and it is determined by the proportional control of the flying capacitor voltage controller 13 and is expressed by the third row in Equations 2. The third row in Equations 2 indicates the duty in the case where the reciprocal of the inductor current $I_L$ is not used. In Equations 2, "$K_P$" refers to a gain of the proportional controller 132.

Equation 2 is summarized into Equation 3, and calculation of a transfer function on the basis of Equation 3 produces Equation 4.

$$(V_{FC}^* - V_{FC}) \cdot K_P \cdot I_L = sC_{FC}V_{FC} \quad \text{[Equation 3]}$$

$$\frac{V_{FC}}{V_{FC}^*} = \frac{\frac{K_P \cdot I_L}{C_{FC}}}{s + \frac{K_P \cdot I_L}{C_{FC}}} = \frac{\omega_{FC}}{s + \omega_{FC}} \quad \text{[Equation 4]}$$

To control the transfer function of Equation 4 in the form of a closed loop of a first-order low pass filter, the relationship of Equation 5 must be established.

$$K_P = \frac{C_{FC} \cdot \omega_{FC}}{I_L} \quad \text{[Equation 5]}$$

Equation 5 shows that the linear control characteristic can be obtained only when the gain for the proportional control is reciprocally proportional to the inductor current.

Therefore, in one embodiment of the present disclosure, with the configuration in which the flying capacitor voltage controller 13 includes the reciprocal calculator 133 for obtaining the reciprocal of the inductor current $I_L$, it is possible to obtain a stable control characteristic for the overall current.

Here, the controller in the flying capacitor voltage controller 13 may be implemented with a proportional integral (PI) controller instead of the proportional controller 132. However, when a PI controller is used, the value accumulated in the integrator is likely to generate a large duty pulsation depending on the direction of current. This means that the controllability is greatly deteriorated in the vicinity of the inductor current $I_L$ becoming zero. Therefore, it is preferable to use a proportional controller.

Figure 7:
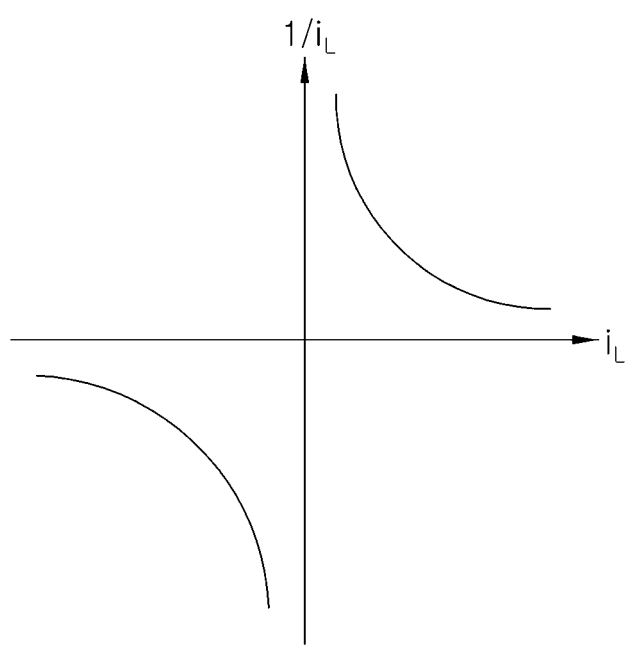
FIGS. 7 to 9 are graphs illustrating the characteristics of the reciprocal of an inductor current, which is used in control operation of the DC-to-DC converter according to one embodiment of the present disclosure.
Figure 8:
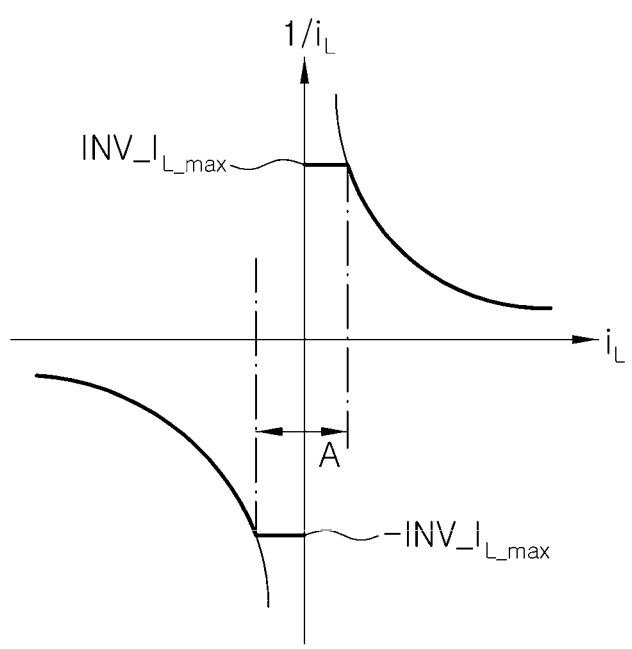
Figure 9:
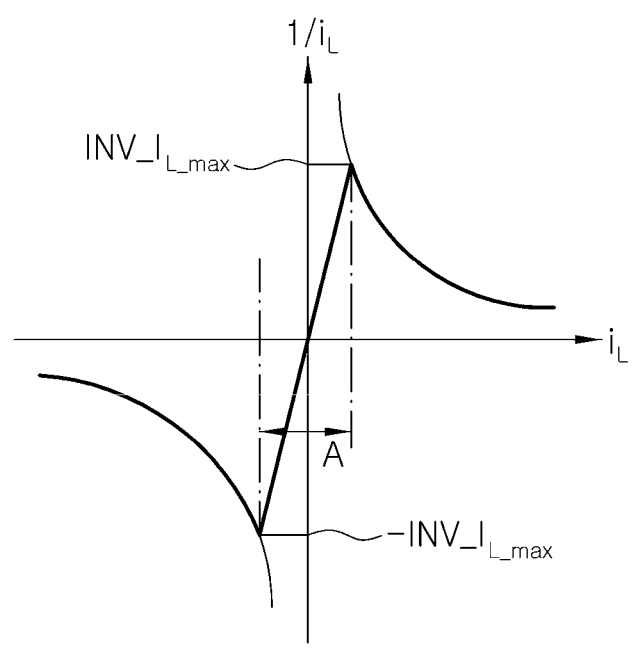

FIGS. 7 to 9 are graphs illustrating the characteristics of the reciprocal of an inductor current, which is used in control operation of the DC-to-DC converter according to one embodiment of the present disclosure.

In the case where the reciprocal of the inductor current $I_L$ is applied to the flying capacitor voltage control as described above, when the inductor current $I_L$ approaches zero as illustrated in FIG. 7, the reciprocal of the inductor current $I_L$ head towards plus infinity or minus infinity. Therefore, the voltage of the flying capacitor cannot be properly controlled or the second control voltage instruction value $V_{CM}$ greatly drifts according to the direction of the inductor current. Due to this effect, there may be a problem that controllability is deteriorated at near zero current.

In various embodiments of the present disclosure, a technique is limiting the inductor current is provided to prevent such a deterioration in controllability.

First, as illustrated in FIG. 8, the reciprocal calculator 133 included in the flying capacitor voltage controller 13 limits the reciprocal $1/I_L$ of the inductor current $I_L$ (i.e., the detection current of the inductor) to a preset constant value of $\pm INV\_I_L\_max$ when the magnitude of the input inductor current $I_L$ is within a preset range A in the vicinity of zero. When the value of the reciprocal ($1/I_L$) of the inductor current $I_L$ is limited as described above, it is possible to prevent the value of the gain from heading toward infinity when the inductor current is near zero. Therefore, it is possible to improve controllability at around zero current.

According to one embodiment of the present disclosure, as illustrated in FIG. 9, there is another technique of preventing deterioration of controllability of the flying capacitor. That is, when the magnitude of the inductor current $I_L$ input to the reciprocal calculator 133 included in the flying capacitor voltage controller 13 is within a preset range A in the vicinity of zero, the reciprocal $1/I_L$ of the inductor current (i.e., detection current of the inductor) is set to linearly change. When the value of the reciprocal ($1/I_L$) of the inductor current $I_L$ is limited to linearly change within a preset range $\pm INV\_I_L\_max$ as described above, it is possible to prevent the value of the gain from heading toward infinity when the inductor current is near zero. Therefore, it is possible to improve the controllability at around zero current.

As described above with reference to FIGS. 8 and 9, in the case of limiting the value of the reciprocal $1/I_L$ of the inductor current $I_L$ (detection current of the inductor) when the inductor current $I_L$ is near zero, the system can stably operate when the controller included in the flying capacitor voltage controller 13 is implemented with a proportional integral controller as well as when the controller is implemented with a proportional controller.

The aforementioned operations/functions performed by the controller can be embodied as computer readable code/algorithm/software stored on a computer readable recording medium. The computer readable recording medium is any data storage device that can store data which can thereafter be read by a computer or a processor/microprocessor. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

The aforementioned controller may include one or more processors/microprocessors. The controller may be implemented with circuits. The controller may perform the above described operations/functions, by executing the computer readable code/algorithm/software stored on the computer readable recording medium.

Although the present disclosure has been described with reference to preferred embodiments, the preferred embodiments are presented to describe the technical spirit of the present disclosure only for illustrative purposes and those skilled in the art will appreciate that various modifications and changes are possible, without departing from the scope and spirit of the present disclosure. Therefore, it should be understood that the protection scope of the present disclosure is defined by the accompanying claims rather than the description which is presented above.

What is claimed is:

1. A DC-to-DC converter comprising:
a first capacitor;
a first switch, a second switch, a third switch, and a fourth switch connected in series between a first electrode and a second electrode of the first capacitor;
a second capacitor having a first electrode and a second electrode respectively connected to a connection node of the first switch and the second switch and a connection node of the third switch and the fourth switch;
an inductor connected to a connection node of the second switch and the third switch at a first terminal thereof; and
a controller that controls an on/off state of each of the first to fourth switches on a basis of a calculation result using a difference between a first detection voltage and a first voltage instruction value, a difference between a second detection voltage and a second voltage instruction value, and a reciprocal of a detection current that is a measured current flowing through the inductor,
wherein the first detection voltage is a measured voltage between the first electrode and the second electrode of the first capacitor or a measured voltage between a second terminal of the inductor and a connection node of the first capacitor and the fourth switch.

2. The DC-to-DC converter according to claim 1, wherein the controller controls the on/off state of each of the first to fourth switches on a basis of a value obtained by applying a preset proportional control constant to the difference between the second detection voltage and the second voltage instruction value and by multiplying a resultant value of the application of the preset proportional control constant by the reciprocal of the detection current.

3. The DC-to-DC converter according to claim 2, wherein when the detection current has a magnitude that is within a preset range in a vicinity of zero, the controller determines the reciprocal of the detection current as a preset constant value.

4. The DC-to-DC converter according to claim 2, wherein when the detection current has a magnitude that is within a preset range in a vicinity of zero, the controller determines the reciprocal of the detection current as a preset constant value that linearly changes within the preset range.

5. The DC-to-DC converter according to claim 1, wherein the controller comprises:
a voltage controller that generates a current instruction value with respect to a current flowing through the inductor on a basis of the difference between the first detection voltage and the first voltage instruction value;
a current controller that generates a first control voltage instruction value on a basis of a difference between the current instruction value and the detection current; and
a flying capacitor voltage controller that generates a second control voltage instruction value on a basis of the difference between the second detection voltage and the second voltage instruction value and the reciprocal of the detection current.

6. The DC-to-DC converter according to claim 5, wherein the flying capacitor voltage controller comprises:
a subtractor that calculates the difference between the second detection voltage and the second voltage instruction value;
a proportional controller that outputs a value obtained by applying a proportional control value to a calculation result of the subtractor;
a reciprocal calculator that calculates the reciprocal of the detection current; and
a multiplier that multiplies the value output by the proportional controller by a calculation result of the reciprocal calculator and outputs a product resulting from the multiplication as the second control voltage instruction value.

7. The DC-to-DC converter according to claim 6, wherein when the detection current has a magnitude that is within a preset range in a vicinity of zero, the reciprocal calculator determines the reciprocal of the detection current as a preset constant value.

8. The DC-to-DC converter according to claim 6, wherein when the detection current has a magnitude that is within a preset range in a vicinity of zero, the reciprocal calculator determines the reciprocal of the detection current as a preset constant value that linearly changes within the preset range.

9. The DC-to-DC converter according to claim 5, wherein the controller comprises:

a first adder that adds the first control voltage instruction value and the second control voltage instruction value to produce a first duty instruction value;

a subtractor that subtracts the first control voltage instruction value from the first detection voltage;

a second adder that adds an output value of the subtractor to the second control voltage instruction value to produce a second duty instruction value;

a first switching controller that determines an on/off state of each of the first switch and the fourth switch according to a result of comparison between the first duty instruction value and a triangular wave signal having a predetermined frequency; and a second switching controller that determines an on/off state of each of the second switch and the third switch according to a result of comparison between the second duty instruction value and the triangular wave signal.

10. The DC-to-DC converter according to claim 1, further comprising a voltage sensor for obtaining the measured voltage between the first electrode and the second electrode of the first capacitor or the measured voltage between the second terminal of the inductor and the connection node of the first capacitor and the fourth switch.

11. The DC-to-DC converter according to claim 1, further comprising a current sensor for obtaining the measured current flowing through the inductor.

* * * * *